July 19, 1966 A. J. WILSON ET AL 3,261,430
SPOT TYPE DISC BRAKES
Original Filed July 11, 1963 11 Sheets-Sheet 1

Inventors
Alexander John Wilson
Stewart Kervern Hambling
Anthony William Harrison
BY: Scrivener and Parker
Attorneys

July 19, 1966  A. J. WILSON ET AL  3,261,430
SPOT TYPE DISC BRAKES
Original Filed July 11, 1963  11 Sheets-Sheet 5

United States Patent Office 3,261,430
Patented July 19, 1966

3,261,430
SPOT TYPE DISC BRAKES
Alexander John Wilson, Sutton Coldfield, Stewart Kevern Hambling, Tamworth, and Anthony William Harrison, Selly Oak, Birmingham, England, assignors to Girling Limited, Birmingham, England, a British company
Continuation of abandoned application Ser. No. 294,282, July 11, 1963. This application July 1, 1965, Ser. No. 473,550
6 Claims. (Cl. 188—73)

This application is a continuation of our prior application Serial No. 294,282 filed July 11, 1963 and now abandoned.

This invention relates to improvements in disc brakes of the kind in which friction pads adapted to engage opposite faces of a rotatable disc are associated with a caliper or clamping member which straddles a portion of the disc and carries or incorporates first actuating means for urging one friction pad into engagement with one face of the disc, the other friciton pad being urged into engagement with the opposite face of the disc by second actuating means associated with the caliper or clamping member or by the reaction of the first actuating means on the caliper or clamping member which cause the caliper or clamping member to slide or swing relative to the disc.

In the usual brake of this type at least one of the friction pads is mounted on a rigid backing plate located between spaced abutments in the caliper or clamping member. When the brake is applied the pad tends to move angularly with the disc and the backing plate is urged against the abutment at its rear end which takes the braking torque on the pad. The pad then tends to swing in towards the disc, swinging about the rear end of the backing plate as a fulcrum, and the pad behaves in a similar manner to a leading shoe in an internal shoe drum brake. It is believed that this effect is the cause of "brake squeal" which is sometimes produced when the brake is applied.

According to the present invention, in a disc brake of the kind set forth the torque on at least the actuated pad is taken solely by means located at or adjacent the forward end of a rigid backing plate carrying the friction pad, that is, the end with which any given point on the surface of the disc first comes into alignment in the normal direction of rotation of the disc.

According to a further feature of the invention, when the caliper or clamping member moves or swings relative to the disc and a first friction pad is urged into engagement with one face of the rotatable disc by the reaction on the caliper of the actuating means which urge the other friction pad into engagement with the opposite face of the disc, the first friction pad is applied to the disc through an adjuster which automatically advances the pad relative to the disc in a direction towards the disc as the pad wears thereby reducing to a minimum the movement of the caliper or clamping member.

Thus when the brake is applied at least the actuated friction pad has no force acting on it which tends to swing it towards the disc and it behaves in a similar manner to a trailing shoe in an internal shoe drum brake and the tendency for the brake to squeal is eliminated or greatly reduced.

The means for taking the torque at or adjacent to the forward end of the backing plate and for reducing to a minimum the movement of the caliper or clamping member relative to the disc as the pad wears in the case of a sliding or swinging caliper or clamping member, may be arranged in various ways.

Some practical forms of disc brakes embodying our invention are illustrated diagrammatically, by way of example, in the accompanying drawings in which.

Figure 1:
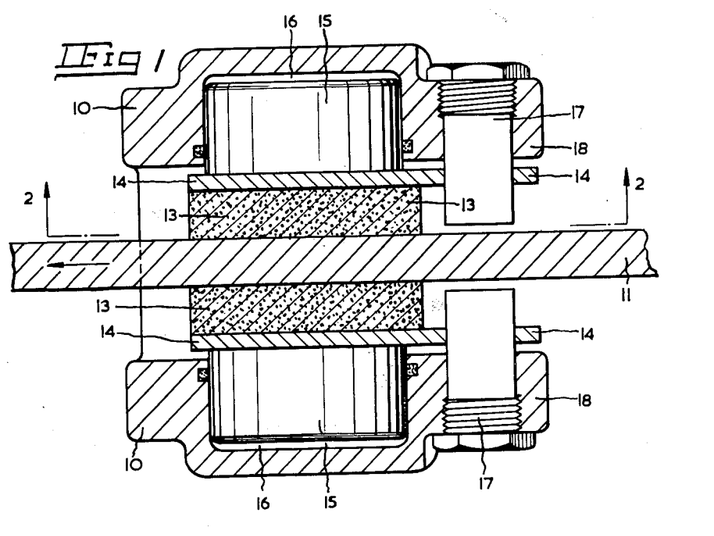
FIGURE 1 is a section through a brake caliper in a plane at right angles to a radius of the disc passing through the centre of the caliper.
Figure 2:
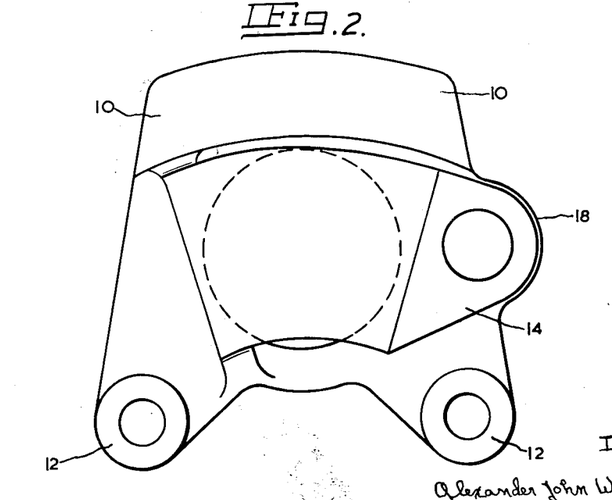
FIGURE 2 is a section on the line 2—2 of FIGURE 1.

In FIGURES 1 and 2, 10 is a caliper of substantially U form adapted to straddle a portion of the periphery of a brake disc 11, rotating with a wheel or other part of a vehicle transmission. The caliper is fixed to a non-rotating part of the vehicle by bolts passing through lugs 12 extending inwardly from one limb.

Opposite faces of the disc are adapted to be engaged by friction pads 13 bonded to rigid backing plates 14 which are urged towards the disc by pistons 15 working in opposed hydraulic cylinders 16.

When the brake is applied the friction pads tend to rotate with the disc, and in the construction shown in FIGURES 1 and 2 the torque on the friction pads is taken by abutments comprising pins 17 screwed through lugs 18 on the caliper limbs at one end and passing through openings in the backing plates which are extended at that end.

The disc rotates in the direction indicated by the arrows in the drawings and the pins 17 are located at the forward ends of the backing plates, that is the ends which any given point on the braking surface of the disc first approaches.

Thus when the brake is applied the friction pads trail from the pins by which the torque is taken and behave in a manner similar to a trailing shoe in a shoe drum brake.

Figure 3:
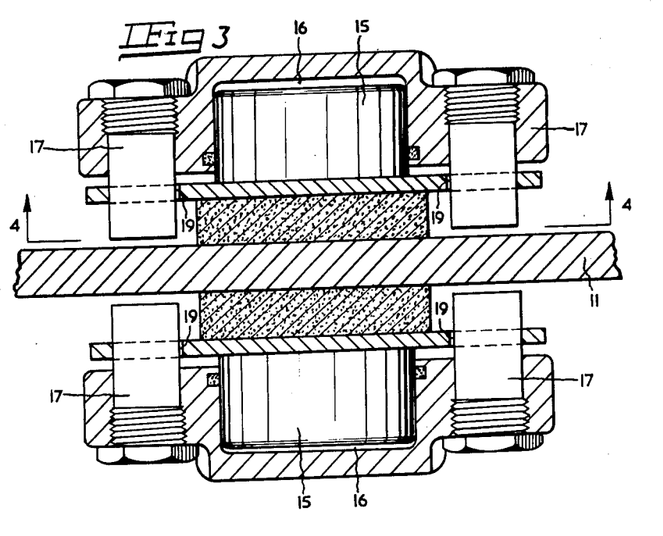
FIGURE 3 is a section similar to FIGURE 1, showing a modified construction.
Figure 4:
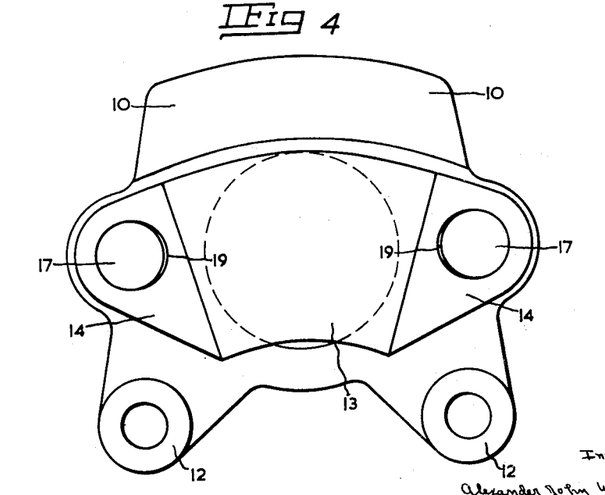
FIGURE 4 is a section on the line 4—4 of FIGURE 3.

In the modification shown in FIGURES 3 and 4 there are torque-taking abutments at each end of the caliper comprising pins 17 passing through holes in each end of each backing plate. The holes in the backing plate are of such a form as to provide a clearance 19 on the inner side of each pin so that in whatever direction the disc is rotating the torque on the friction pads will be taken wholly by the pins at the ends of the backing plates with which any given point on the disc first comes into alignment.

In the two constructions described above, on removal of the pins 17 the friction pads with their backing plates can be removed and replaced in a substantially circumferential direction through the end of the caliper.

Figure 5:
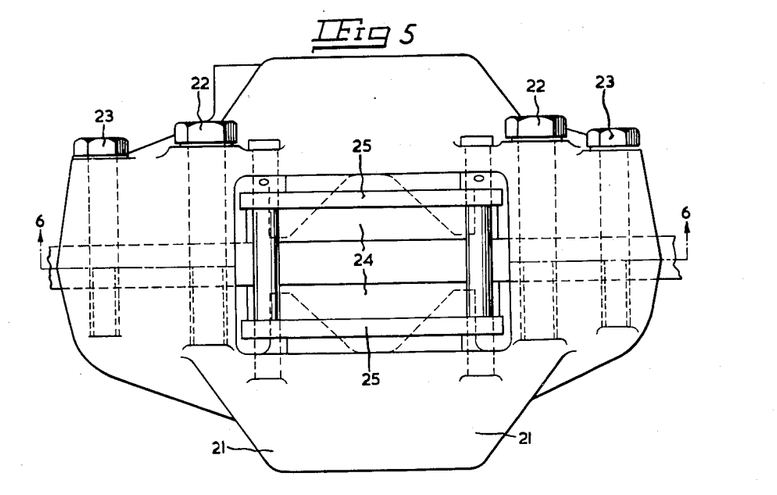
FIGURE 5 is a plan of another form of caliper.
Figure 6:
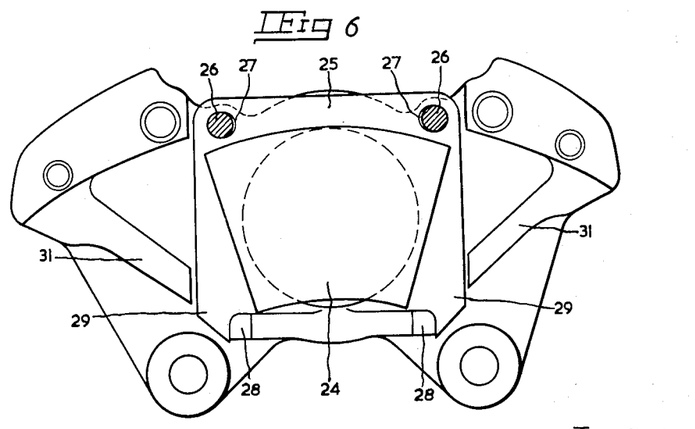
FIGURE 6 is a section on the line 6—6 of FIGURE 5.

FIGURES 5 and 6 show the application of our invention to a disc brake having a caliper 21 with an opening in its radially outermost side for the insertion and removal of the friction pads. The caliper is formed from two castings secured together at each end by bolts 22, 23. Each friction pad 24 is bonded to a backing plate 25 of roughly square outline which is anchored adjacent to its outer end by spaced abutments comprising parallel pins 26 detachably mounted in the caliper and passing through holes in the backing plates. These holes provide clearances 27 on the inenr side of the pins to ensure that when the brake is applied the torque on the friction pad asembly is taken only by the pin at the forward end.

The inner edge of each backing plate is located by abutments 28 on the caliper limb engaged by lugs 29 at opposite ends of a recess in the inner edge of the plate.

Inclined bars 31 may be provided on the inner faces of the end parts of the caliper to act as scrapers to keep the surface of the disc free from mud in bad weather.

On removal of the pins 26 the pads and backing plates can be withdrawn and insterted through the opening in the radially outer side of the caliper.

In further modifications actuating means are located in or on one limb of a caliper or clamping member for urging the adjacent friction pad into engagement with a disc and the other pad is brought into engagement with the opposite face of the disc by the reaction of the actuating means on the caliper or clamping member and the caliper or clamping member slides or swings relative to the disc.

Figure 7:
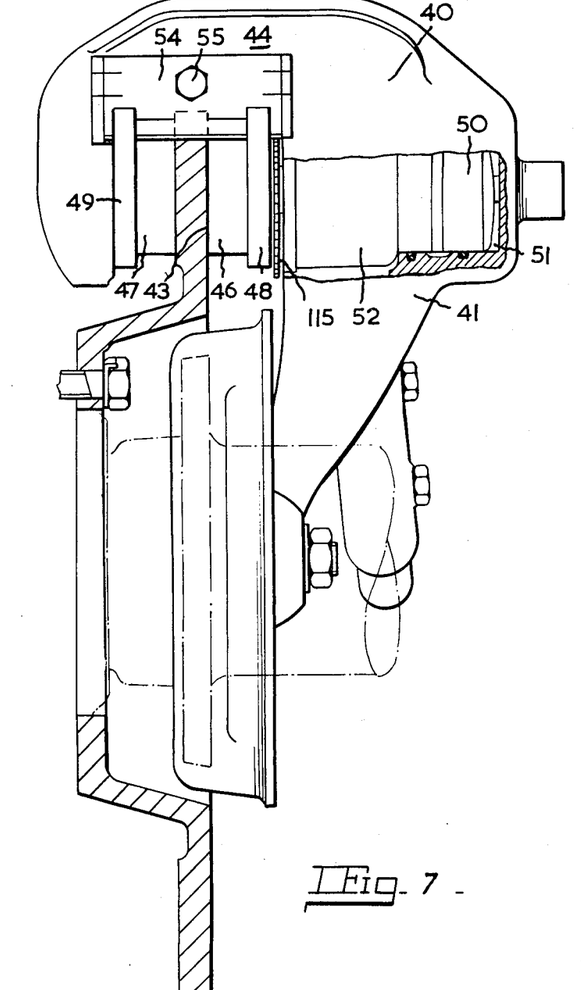
FIGURE 7 is an end view including a fragmentary section through a brake caliper in the plane of the disc.
Figure 8:
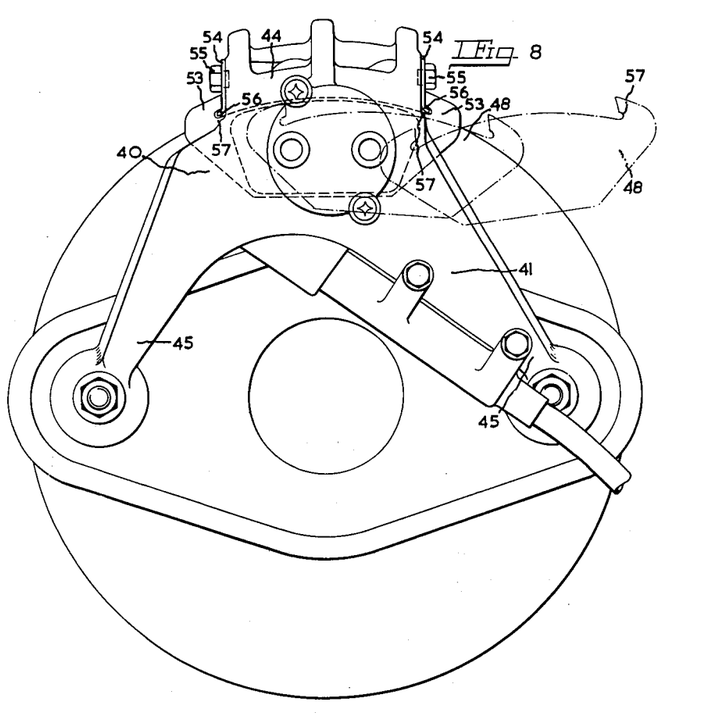
FIGURE 8 is an elevation of one side of the caliper shown in FIGURE 7.

As shown in FIGURES 7 and 8 a caliper or clamping member 40 comprises a rigid member of U-form having spaced limbs 41 and 42 lying on opposite sides of a disc 43 which rotates with a wheel. Each limb extends radially inwards from a bridge portion 44 which lies outside the periphery of the disc and the caliper or clamping member is attached to a non-rotating part of the vehicle by bolts passing through clearance holes in spaced lugs 45 extending radially inwards from the periphery of the disc.

Opposite faces of the disc 43 are adapted to be engaged by friction pads 46 and 47 and the pad 46 bonded to a rigid backing plate 48 is urged into engagement with the disc by a piston 50 working in an hydraulic cylinder 51 located in the limb 41.

Alternatively the pad 46 can be applied mechanically by a mechanism 52 actuated by the hand brake of the vehicle which also actuates an adjuster 115 to compensate for wear on the pad 46.

The backing plate 48 has at opposite ends opposed lugs 53 extending radially outwards on each end of the bridge portion 44 and engaging at their inner edges with locating torque taking plates or keepers 54 attached on either side of the bridge portion by bolts 55 (FIGURES 7 and 8). The plate 48 is retained against radial movement in either direction by outwardly projecting abutment surfaces 56 engaging with opposed recesses 57 formed in the inner ends of each lug 53. On removal of one of the locating plates or keepers 54, the backing plate and pad assembly can be removed in a circumferential direction through the open end of the caliper or clamping member after moving the assembly radially inwards to disengage the other end of the backing plate from the other locating plate or keeper, which may be fixed or may also be detachably secured to the caliper or clamping member.

The locating plates or keepers 54 are arranged to take the torque on the friction pad and this is an advantage where the caliper or clamping member is made of light alloy or other material with poor resistance to fretting as the locating plates or keepers can be made of steel or other hard material. Alternatively, where the caliper or clamping member is made of a wear-resisting material, the locating plates or keepers 54 may be recessed into the ends of the caliper or clamping member so that the backing plates bear directly on the caliper or clamping member.

Figure 9:
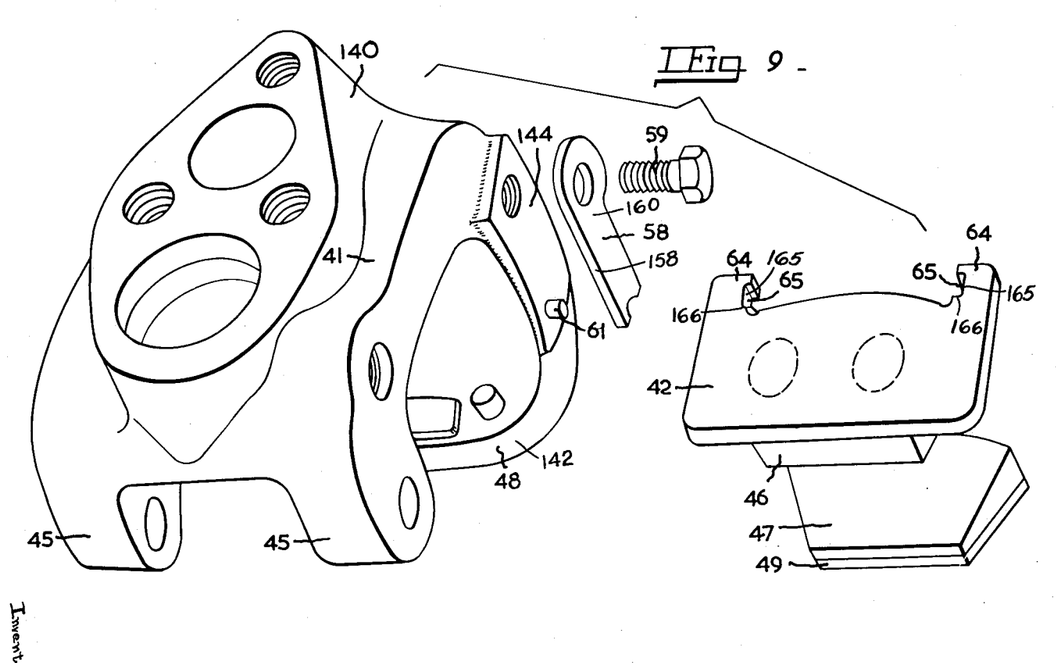
FIGURE 9 is a perspective view of another form of brake caliper.

In a further embodiment as illustrated in FIGURE 9, a detachable torque taking plate or keeper 58 is attached on one end of the bridge portion 144 of a clamping member 140 by a bolt 59 and has a recess 60 at its free end which co-operates with a peg 61 provided on the bridge portion. The backing plate 48 to which the friction pad 46 is bonded has at opposite ends opposed lugs 64 extending radially outwards and having recesses 65 formed in their inner ends, one of which is adapted to receive abutment surfaces of the plate or keeper 58 when the pad is positioned within the caliper or clamping member 140. The recess in the other lug 64 receives a similar member attached to the other end of the bridge portion which may be fixed or may also be detachably secured to the bridge portion as described above.

The plate or keeper 58 is rectangular in section and is provided with two unrelated surfaces 158, 160. The surface 160 is adapted to co-operate with a complementary surface 165 in the recess 65 in the lug of the backing plate for taking the circumferential component of torque on the backing plate in the application of the brake.

The radial component of the braking torque is taken by a surface on the keeper attached to the other end of the bridge portion of the caliper which corresponds to the surface 160. The radial component is transferred to this surface from a complementary surface 166 in the recess 65. It will be appreciated that in the application of the brake the circumferential component of torque is of a substantially greater magnitude than that of the radial component, and the area of each surface is chosen in accordance with the magnitude of each particular component of torque.

On removal of the detachable plate or keeper 58 by removal of the bolt 59, the backing plate and pad assembly can be removed in a circumferential direction through the open end of the caliper or clamping member as described above.

In another embodiment the backing plate may have at opposite ends parallel lugs extending radially outwards and engaging slidably with machined parallel guiding and torque taking surfaces on the bridge portion of the caliper or clamping member. With that arrangement the pad can be retained against moving radially inwards by a pin parallel to the axis of the disc and passing through openings in the lugs on the backing plate and detachably fixed in bosses or equivalent parts on the bridge portion.

Alternatively the backing plate may have a single central radially projecting lug which is received in a slot in the bridge portion of the caliper or clamping member and is retained by any convenient means.

The advantage of our constructions described above with reference to FIGURES 7–9 of the drawings, is that torque take-off is independent of the extent of wear on the friction pads which is particularly important as the actuated pad 46 has to move through a distance sufficient to accommodate the wear on both pads.

In these constructions the non-actuated friction pad 47 which is applied by the reaction on the caliper or clamping member 40 or 140 may be bonded or otherwise secured to its adjacent limb 42 or 142 of the caliper or clamping member or it may be mounted on a backing plate 49 which is guided on the bridge portion 44 or 144 in the same way as the actuated pad 46.

Figure 10:
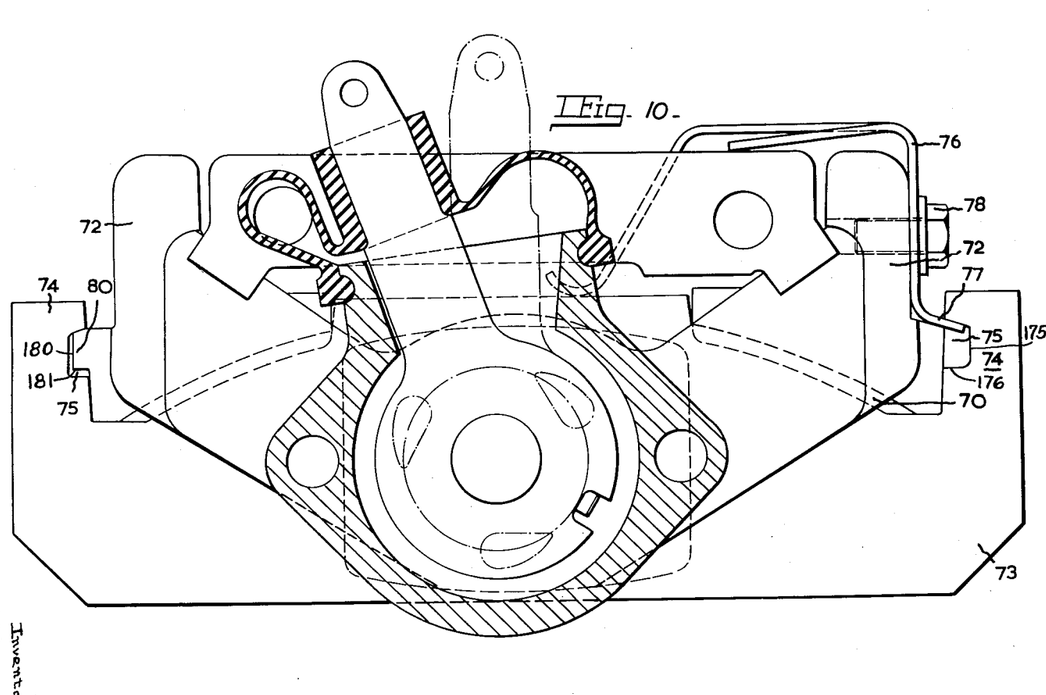
FIGURE 10 is a section through yet another form of brake caliper in a plane parallel to the plane of the disc.

FIGURE 10 shows a brake in which a disc 70 is carried by and rotates with a shaft and a floating or sliding caliper or clamping member 72 straddles the outer periphery of the disc. The backing plate 73 has at opposite ends opposed lugs 74 which extend beyond the outer periphery of the disc.

Figure 13:
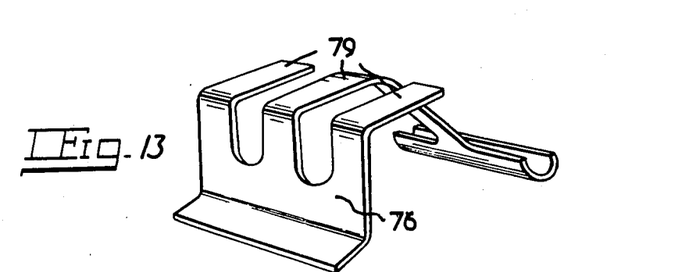
FIGURE 13 is a perspective view of a guide plate embodied in the construction illustrated in FIGURE 10.

Recesses 75 are provided at the inner ends of the lugs 74 and one of the recesses is engaged by one end 77 of an abutment surface formed on a torque taking plate 76 attached to one end of the caliper or clamping member by a bolt 78. The guide plate (FIGURE 13) is formed with resilient extending fingers 79 which are curved and cranked to bear resiliently on the backing plate 73 and the caliper or clamping member respectively to prevent rattle.

The other recess 75 may be engaged by an abutment surface of a similar torque taking guide plate or alternatively this recess may be engaged by a fixed torque taking abutment 80 carried by the caliper or clamping member.

In the application of the brake with the disc rotating in a counter clockwise direction the circumferential component of the braking torque is taken by the surface 180 on the abutment 80 carried by the caliper whilst the radial component of torque at the opposite end of the backing plate is taken by the surface 176 on the abutment 75 carried by the opposite end of the caliper. With the disc rotating in the opposite direction the circumferential component is taken by the surface 175 of the abutment 75 and the radial component is taken by the surface 181.

Figures 11, 15:
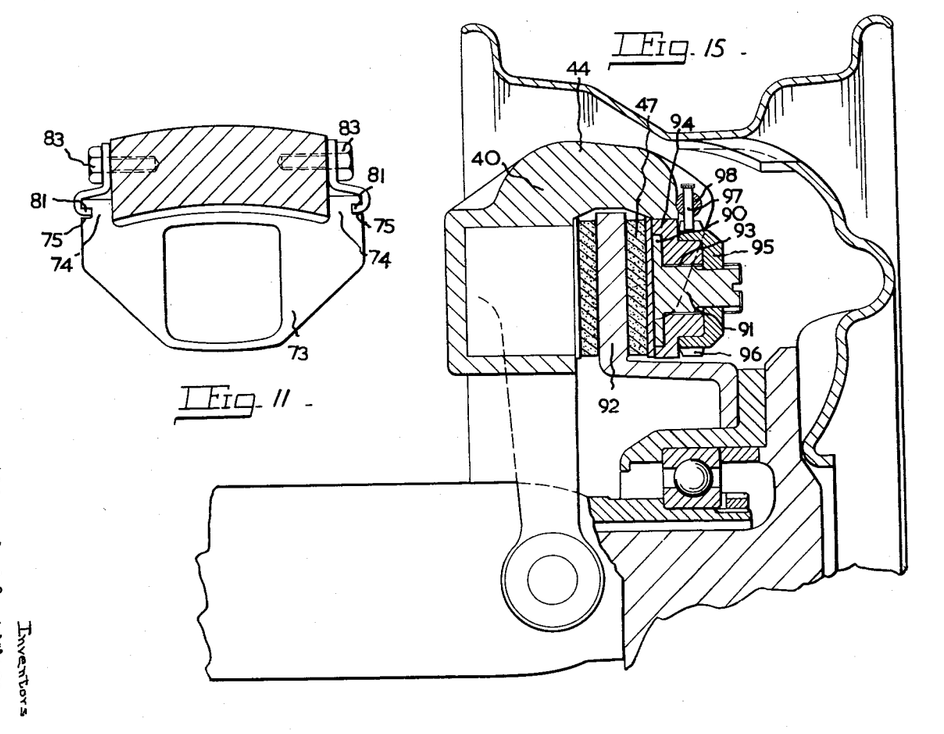
FIGURE 11 is an end view showing one construction for guiding a backing plate.
FIGURE 15 is an end elevation including a fragmentary section on the line 15—15 of FIGURE 14.

As shown in FIGURE 11, the recesses 75 may be provided in the outer ends of the lugs 74 and in this construction one abutment end 81 of each torque taking guide plate 82 engages with each recess and the guide plates are secured to the caliper or clamping member by bolts 83.

Figure 12:
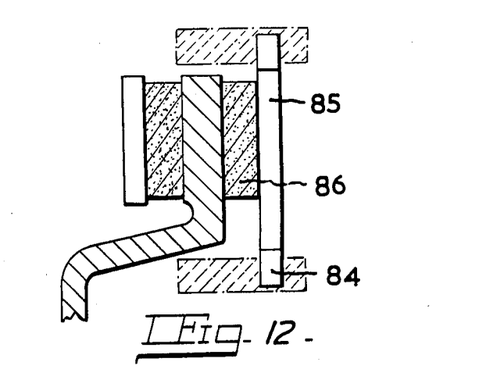
FIGURE 12 is a view showing guiding means for a backing plate disposed beyond the inner periphery of the disc.

When the disc comprises a ring extending inwardly from a wheel rim or a bell housing and the caliper or clamping member straddles the inner periphery of the disc, lugs 84 on backing plate 85 carrying the directly actuated pad 86, will extend inwardly beyond the inner periphery of the disc (FIGURE 12).

With the construction described above, in which the indirectly actuated pad 47 is applied to the disc by axial or angular movement of the caliper or clamping member 40, this movement increases the wear of the friction pads and clearances sufficient to allow for this movement have to be provided between the disc and between the caliper or clamping member and a wheel or other member by which the disc is carried. It is therefore desirable, in installations where the space available is limited, to reduce this movement of the caliper or clamping member to a minimum and this is achieved by mounting and guiding the indirectly actuated friction pad 47 in the limb of the caliper or clamping member in such a way that its position is automatically adjusted to take up wear.

Figure 14:
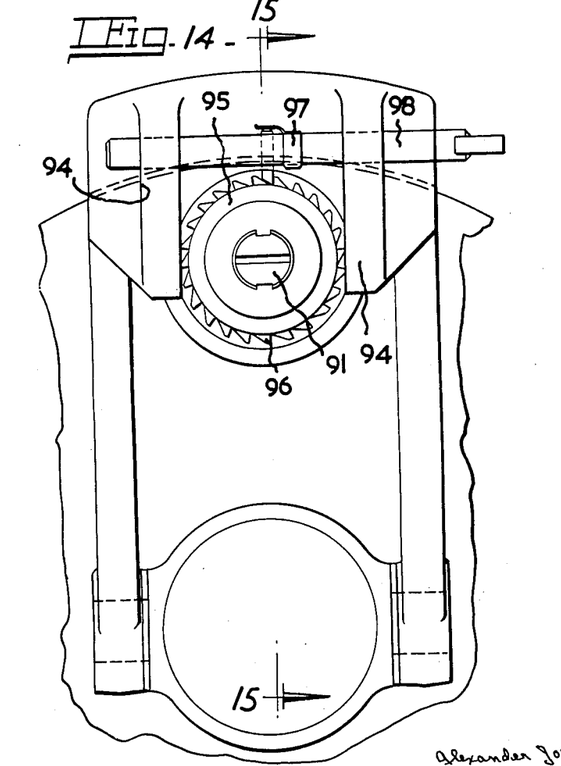
FIGURE 14 is an end view of yet another form of brake caliper.
Figure 16:
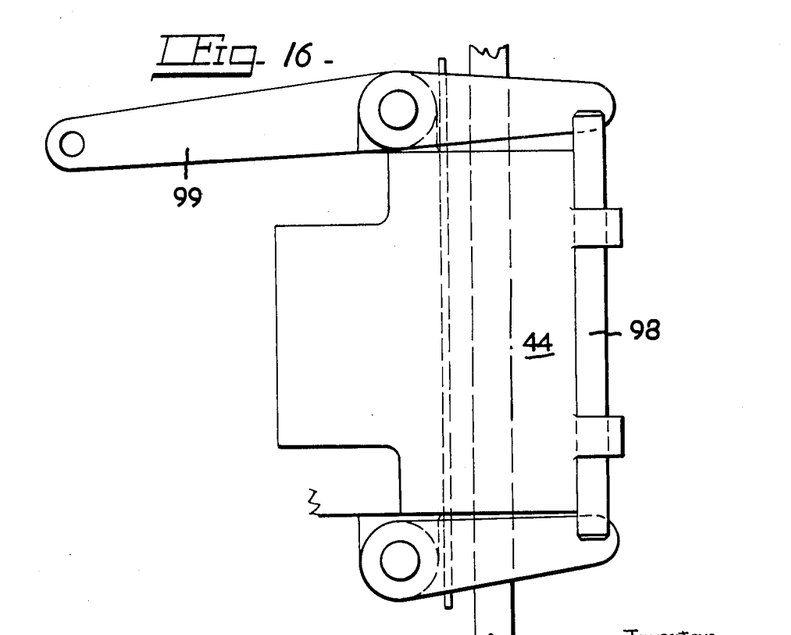
FIGURE 16 is a plan of the caliper illustrated in FIGURES 14 and 15.

In one convenient arrangement as illustrated in FIGURES 14, 15 and 16 the pad is backed by a member 90 having a stem 91 of which the axis is parallel to that of that disc 92 and which is guided to slide in a bore 93 in the caliper limb 94. The outer end of the stem is screw-threaded and works through a rotatably anchored nut 95 having peripheral ratchet teeth 96, the teeth are engaged by a resilient pawl 97 on a rod 98 guided for reciprocal movement in a direction at right angles to the axis of the stem and moving with a hand lever 99 for actuating the brake so that the nut 95 is rotated step-by-step to adjust the position of the indirectly actuated pad 47 when the movement of the rod in the application of the brake exceeds a predetermined value.

Figure 17:
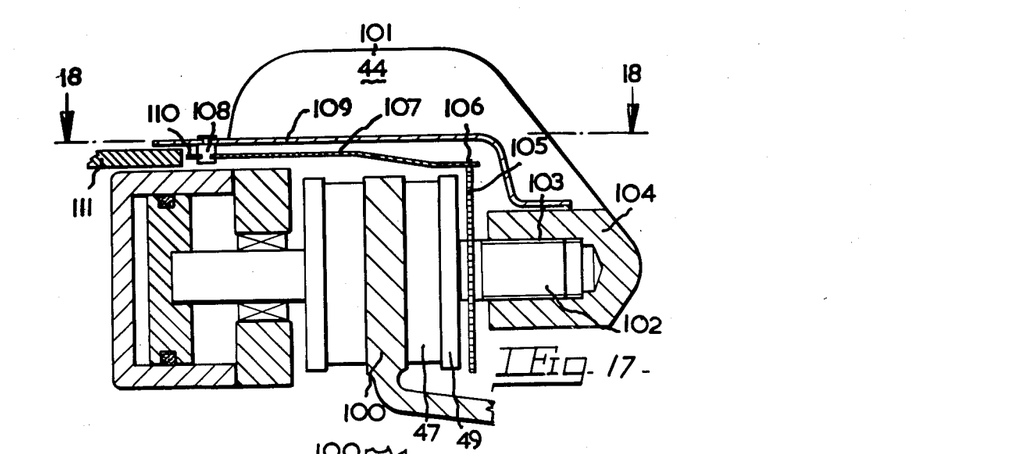
FIGURE 17 is a section on the line 17—17 of FIGURE 18.
Figure 18:
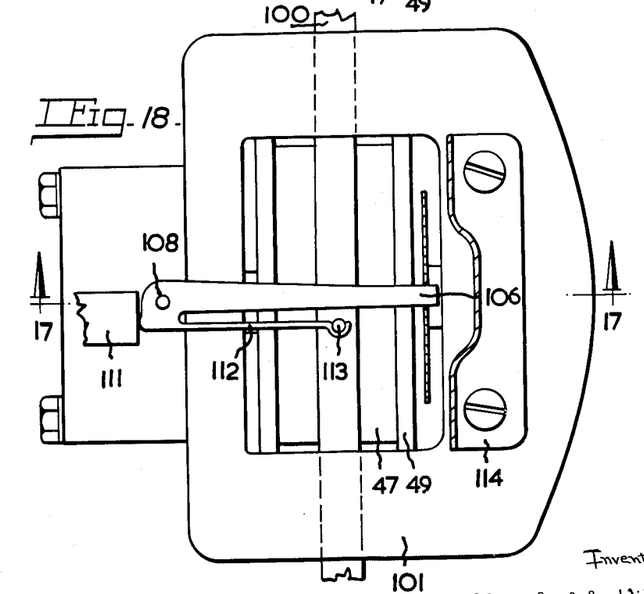
FIGURE 18 is a section on the line 18—18 of FIGURE 17.

In another construction shown in FIGURES 17 and 18 the indirectly actuated pad 47 is applied to the disc 100 through an automatic adjuster which advances the pad relative to the caliper or clamping member 101 in a direction towards the disc as the pad wears. The indirectly actuated pad 47 is carried by a rigid backing plate 49 which is engaged by a screw-threaded stem or spindle 102 screwed into a tapped bore 103 in adjacent limb 104 of the caliper or clamping member 101, the axis of the stem being substantially at right angles to the plane of the disc.

A peripheral toothed ratchet wheel 105 is mounted on the stem adjacent to its inner end and is engaged by a pawl 106 formed at the free end of a resilient finger 107 pivotally mounted adjacent to its outer end on a pin 108 carried by a mounting frame 109 fixed to the caliper, the axis of the pin being at right angles to the axis of the stem.

A projection 110 on the finger offset from the pivot is held in engagement with a stationary abutment 111 by a spring 112 which may be an integral part of the finger bearing on an abutment 113 on the mounting frame.

Movement of the caliper relative to the stationary abutment 111 rocks the finger 107 angularly about its pivot and if the movement of its free end exceeds the spacing between adjacent teeth on the ratchet wheel 105, the screwed stem 102 is rotated through one or more steps to move the indirectly actuated pad 47 towards the disc to compensate for wear of the pad.

Any convenient means may be provided for maintaining a minimum clearance between the friction pad and the disc. For example, a certain degree of lost motion may be provided between the ratchet wheel 105 and the stem 102 or at any convenient point in the mechanism.

The mounting frame 109 on which the finger 107 is pivoted is preferably itself mounted on the caliper adjacent to the indirectly actuated friction pad 47 so that the adjustment is not sensitive to deflection of the caliper under load.

The mounting frame may also form the means for retaining the friction pads in position so that removal of plate 114 for replacement of the friction pads automatically frees the finger from the ratchet wheel 105 and the screwed stem 102 can be readily returned to its initial position.

Angular movement of the stem 102 except by the advancing ratchet and pawl mechanism can be prevented by providing any convenient frictional resistance to such movement, such a ratchet device which may be stepless, or a detent device.

Temperature sensitive means may be incorporated in the mechanism to prevent over adjustment owing to thermal distortion. For example, the resilient finger 107 may be of bimetallic material so that it deflects clear of the ratchet wheel when heated beyond a certain temperature and the adjuster becomes inoperative.

The advantage of our last two constructions described above is that reduction in the movement of the caliper or clamping member allows the clearance between the caliper or clamping member and the disc to be reduced, with a consequent reduction in the stressed length of the caliper bridge portion 44 and a reduction in the deflection of the caliper or clamping member under load.

Where a wear adjuster 115 (FIGURE 7) is incorporated in the actuating means the two adjusters may be coupled together.

We claim:
1. A disc brake comprising a rotatable disc, a caliper straddling a portion of the outer periphery of said disc and movable axially relative to said disc, friction pad assemblies for engagement with opposite faces of said disc housed in opposed limbs of said caliper and of which one is axially movable relative to the caliper, actuating means carried by the caliper for urging said axially movable friction pad assembly into engagement with one face of said disc, said other friction pad assembly being actuated indirectly and urged into engagement with the opposite face of the disc by the reaction on the caliper of the actuating means for said axially movable friction pad, retaining means for at least said axially movable pad assembly positioned at each end of said caliper outside the periphery of said disc, said retaining means including first and second angularly related abutment faces, lug means at each end of at least said axially movable pad assembly extending outside the periphery of the disc and having first and second angularly related faces complementary to the respective abutment faces of said retaining means, the first of said faces on said retaining means and on said lug means being constructed and arranged to cooperate with each other to take a major part of the circumferential component of drag at the end of the caliper with which any part on the disc first comes into alignment, and the second of said faces being constructed and arranged to cooperate with each other to take a major part of the radial component of drag at the opposite end of the caliper, and means for effecting detachment of said lug means from said retaining means, said detachment means being constructed and arranged to permit at least said axially movable friction pad assembly to be removed from the caliper in a circumferential direction relative to the disc.

2. A disc brake according to claim 1 wherein at least the retaining means at one end of said caliper comprises plate means.

3. A disc brake according to claim 2 wherein said detachment means comprises readily releasable means detachably connecting said plate means to the end of said caliper.

4. A disc brake according to claim 1 wherein the indirectly actuated pad assembly includes lug means cooperating with the abutment faces of said retaining means.

5. A disc brake according to claim 2 wherein said plate means comprises a flat plate substantially rectangular in cross-section.

6. A disc brake according to claim 5 wherein the first abutment face of said flat plate is substantially parallel to the plane of said disc and the second abutment face is at substantially right angles thereto and of substantially smaller area than said first abutment face.

References Cited by the Examiner

UNITED STATES PATENTS 2,655,229 10/1953 Eksergian _________ 188—73

FOREIGN PATENTS 1,229,040 3/1960 France.
785,367 10/1957 Great Britain.

MILTON BUCHLER, *Primary Examiner.*

G. E. A. HALVOSA, *Assistant Examiner.*